United States Patent
Naik et al.

(10) Patent No.: US 10,186,282 B2
(45) Date of Patent: Jan. 22, 2019

(54) ROBUST END-POINTING OF SPEECH SIGNALS USING SPEAKER RECOGNITION

(71) Applicant: Apple Inc., Cupertino, CA (US)

(72) Inventors: Devang K. Naik, San Jose, CA (US); Sachin Kajarekar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 14/701,147

(22) Filed: Apr. 30, 2015

(65) Prior Publication Data
US 2015/0371665 A1 Dec. 24, 2015

Related U.S. Application Data

(60) Provisional application No. 62/014,571, filed on Jun. 19, 2014.

(51) Int. Cl.
| | |
|---|---|
| G10L 15/00 | (2013.01) |
| G10L 15/07 | (2013.01) |
| G10L 25/87 | (2013.01) |
| G10L 17/22 | (2013.01) |
| G10L 25/78 | (2013.01) |
| G10L 17/00 | (2013.01) |

(52) U.S. Cl.
CPC .............. *G10L 25/87* (2013.01); *G10L 17/22* (2013.01); *G10L 25/78* (2013.01); *G10L 17/00* (2013.01)

(58) Field of Classification Search
CPC ....... G10L 15/20; G10L 15/063; G10L 15/22; G10L 15/08; G10L 15/26; G10L 15/187; G10L 15/02; G10L 15/04; G10L 15/1815; G10L 25/78; G10L 15/065; G10L 15/18; G10L 15/00; G10L 17/00; G10L 17/04

USPC .............. 704/246–255, 215, 1–10, E17.002, 704/E15.007

See application file for complete search history.

(56) References Cited

U.S. PATENT DOCUMENTS

| | | | | |
|---|---|---|---|---|
| 5,479,488 A | * | 12/1995 | Lennig | H04M 3/4931 379/213.01 |
| 5,729,694 A | * | 3/1998 | Holzrichter | G10L 15/24 704/270 |

(Continued)

FOREIGN PATENT DOCUMENTS

| | | |
|---|---|---|
| DE | 102008024258 A1 | 11/2009 |
| EP | 2107553 A1 | 10/2009 |

OTHER PUBLICATIONS

International Search Report and Written Opinion received for PCT Patent Application No. PCT/US2015/029554, dated Jul. 16, 2015, 11 pages.

Huang et al., "A Novel Approach to Robust Speech Endpoint Detection in Car Environments", Acoustics, Speech, and Signal Processing 2000, ICASSP '00, Proceeding S. 2000, vol. 3, Jun. 5, 2000, pp. 1751-1754.

(Continued)

*Primary Examiner* — Vincent Rudolph
*Assistant Examiner* — Stephen Brinich
(74) *Attorney, Agent, or Firm* — Dentons US LLP

(57) ABSTRACT

Systems and processes for robust end-pointing of speech signals using speaker recognition are provided. In one example process, a stream of audio having a spoken user request can be received. A first likelihood that the stream of audio includes user speech can be determined. A second likelihood that the stream of audio includes user speech spoken by an authorized user can be determined. A start-point or an end-point of the spoken user request can be determined based at least in part on the first likelihood and the second likelihood.

45 Claims, 5 Drawing Sheets

(56) References Cited

U.S. PATENT DOCUMENTS

| | | | | |
|---|---|---|---|---|
| 6,766,295 B1* | 7/2004 | Murveit | ............... | G10L 15/30 |
| | | | | 379/88.01 |
| 8,781,841 B1* | 7/2014 | Wang | .................. | H04M 3/56 |
| | | | | 379/205.01 |
| 9,299,344 B2* | 3/2016 | Braho | .................. | G10L 25/78 |
| 2005/0125226 A1* | 6/2005 | Magee | ................ | G06F 21/32 |
| | | | | 704/246 |
| 2008/0103774 A1* | 5/2008 | White | .................. | G10L 15/08 |
| | | | | 704/254 |
| 2008/0255842 A1 | 10/2008 | Simhi | | |
| 2009/0265171 A1* | 10/2009 | Davis | ............ | G06F 17/30985 |
| | | | | 704/251 |
| 2010/0017382 A1* | 1/2010 | Katragadda | ....... | G06F 17/30976 |
| | | | | 706/12 |
| 2011/0184736 A1* | 7/2011 | Slotznick | ............ | G10L 15/1815 |
| | | | | 704/249 |
| 2012/0078624 A1 | 3/2012 | Yook et al. | | |
| 2013/0030804 A1* | 1/2013 | Zavaliagkos | ............ | G10L 15/26 |
| | | | | 704/235 |
| 2014/0278391 A1* | 9/2014 | Braho | .................. | G10L 15/20 |
| | | | | 704/233 |
| 2015/0003797 A1* | 1/2015 | Schmidt | ................ | G11B 27/10 |
| | | | | 386/201 |

OTHER PUBLICATIONS

International Preliminary Report on Patentability received for PCT Patent Application No. PCT/US2015/029554, dated Dec. 29, 2016, 8 pages.

* cited by examiner

ROBUST END-POINTING OF SPEECH SIGNALS USING SPEAKER RECOGNITION

CROSS-REFERENCE TO RELATED APPLICATION

This application claims priority from U.S. Provisional Ser. No. 62/014,571, filed on Jun. 19, 2014, entitled ROBUST END-POINTING OF SPEECH SIGNALS USING SPEAKER RECOGNITION, which is hereby incorporated by reference in its entirety for all purposes.

FIELD

This relates generally to speech processing and, more specifically, to start-point or end-point detection of speech signals using speaker recognition.

BACKGROUND

Intelligent automated assistants (or virtual assistants) provide a beneficial interface between human users and electronic devices. Such assistants allow users to interact with devices or systems using natural language in spoken and/or text forms. For example, a user can access the services of an electronic device by providing a spoken user request to a virtual assistant associated with the electronic device. The virtual assistant can interpret the user's intent from the spoken user request and operationalize the user's intent into tasks. The tasks can then be performed by executing one or more services of the electronic device and a relevant output can be returned to the user in natural language form.

Often, a spoken user request is commingled with various background noises. The background noises can include, for example, spurious conversation, music, mechanical noise, and environmental noise. To interpret the spoken user request, the virtual assistant can determine the beginning and ending of user speech within the audio input received. Detecting the beginning and ending of user speech is referred to as start-pointing and end-pointing, respectively. Start-pointing and end-pointing can be used to identify the portion of audio input that contains the spoken user request. Additionally, end-pointing can also be used to determine when to stop receiving audio input. In order for a virtual assistant to interpret and process audio input quickly and accurately, robust start-pointing and end-pointing is desired.

Conventional end-pointing algorithms rely on energy features such as short-time energy and zero-crossing rate, to distinguish user speech from background noise in an audio input. However, start-pointing and end-pointing can be significantly compromised when user speech overlaps with spurious background conversation. Spurious background conversation can also be referred to as babble noise. Babble noise can share the same frequency spectrum as user speech and thus can create co-channel interference, making it difficult to determine when user speech starts or ends within an audio input. Without accurate start-pointing and end-pointing, it can be difficult for a virtual assistant to accurately process audio input, which can lead to output errors, incorrect actions performed, and/or burdensome requests to clarify the user's intent.

SUMMARY

Systems and processes for robust end-pointing of speech signals using speaker recognition are provided. In one example process, a stream of audio having a spoken user request can be received. A first likelihood that the stream of audio includes user speech can be determined. The first likelihood can be based at least in part on an energy level of the stream of audio. A second likelihood that the stream of audio includes user speech spoken by an authorized user can be determined. A start-point or an end-point of the spoken user request can be determined based at least in part on the first likelihood and the second likelihood.

DETAILED DESCRIPTION

Figure 1:
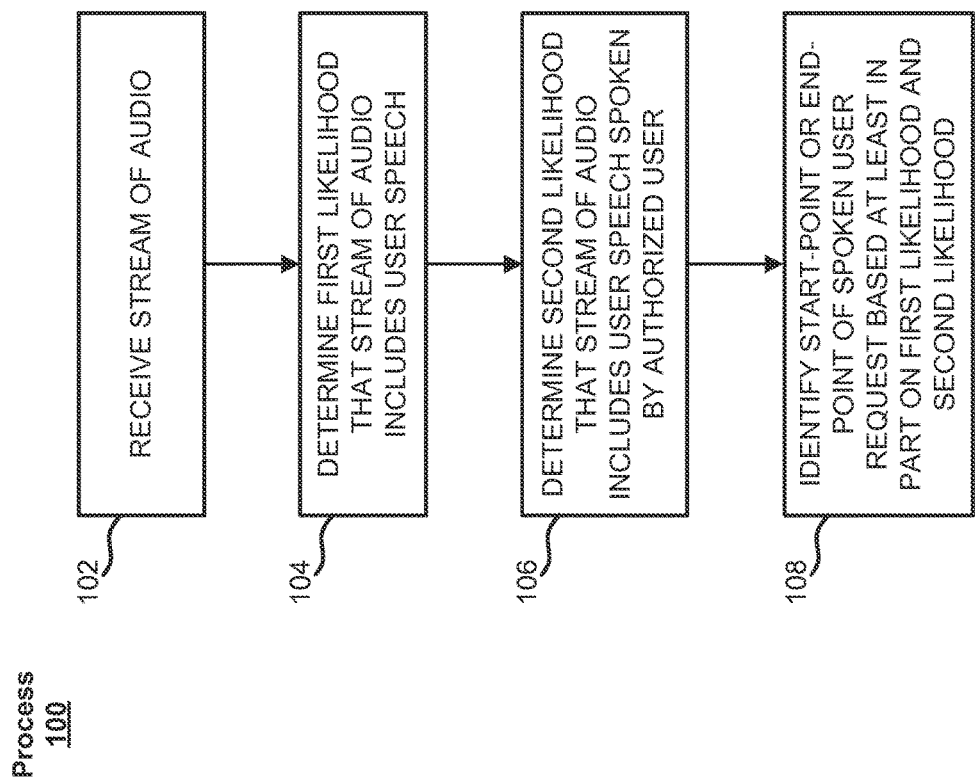
FIG. 1 illustrates an exemplary process for robust end-pointing of speech signals using speaker recognition according to various examples.

In the following description of examples, reference is made to the accompanying drawings in which it is shown by way of illustration specific examples that can be practiced. It is to be understood that other examples can be used and structural changes can be made without departing from the scope of the various examples.

This relates to systems and processes for robust end-pointing of speech signals using speaker recognition. In one example process, a stream of audio having a spoken user request can be received. A first likelihood that the stream of audio includes user speech can be determined. The first likelihood can be based at least in part on an energy level of the stream of audio. A second likelihood that the stream of audio includes user speech spoken by an authorized user can be determined. In some examples, the second likelihood can be determined by performing speaker authentication on the stream of audio to distinguish user speech of an authorized user from other human speech. Speaker authentication can be based at least in part on one or more speech models. A start-point or end-point of the spoken user request can be determined based at least in part on the first likelihood and the second likelihood.

In some examples, determining the first likelihood can include dividing the stream of audio into frames of audio and analyzing each frame of audio for user speech. The frame width for each frame of audio can be 5-40 ms, thereby enabling higher resolution of analysis and the precise identification of the start-point or end-point. However, as described above, the accuracy of the first likelihood can be compromised by the presence of babble noise in the stream of audio. Therefore, in applications where babble noise is prevalent (e.g., personal mobile devices, such as cellular telephones, tablet computers, portable media players, or wearable digital devices), identifying the start-point or end-point using only the first likelihood may not be desirable.

In some examples, determining the second likelihood can include dividing the stream of audio into segments of audio and analyzing each segment of audio for user speech spoken by an authorized user. Each segment of audio can have a segment width of 100-300 ms to achieve sufficient confidence in the analysis. However, segment widths of 100-300 ms can adversely affect the resolution and precision of identifying the start-point or end-point of the spoken user request. Therefore, identifying the start-point or end-point based only on the second likelihood may not be desirable in applications requiring precise and robust determination of the start-point or end-point.

Utilizing both the first likelihood and the second likelihood provides a greater knowledge base for identifying the start-point or end-point. The first likelihood can be used to precisely identify the start-point and end-point while the second likelihood can be used to distinguish speech of an authorized user from other human speech (e.g., babble noise). Therefore, identifying the start-point or end-point based at least in part on the first likelihood and the second likelihood allows for greater accuracy and robustness.

1. Process for Robust Start-pointing or End-pointing of Speech Signals

FIG. 1 illustrates exemplary process 100 for robust end-pointing of speech signals using speaker recognition. FIGS. 2A-D illustrate waveforms representing aspects of the process for robust end-pointing of speech signals using speaker recognition described herein. Process 100 is described with simultaneous reference to FIGS. 1 and 2A-D.

At block 102 of process 100, a stream of audio can be received. The stream of audio can also be referred to as an audio input. The stream of audio can be received as raw sound waves, as an audio file, or in the form of a representative audio signal (analog or digital). In some examples, the stream of audio can be received at a user device (e.g., user device 302, described below). In other examples, the stream of audio can be received at a remote system, such as a server (e.g., server system 310 or virtual assistant server 314, described below). The stream of audio can include user speech, such as a spoken user request. The user speech can include a spoken user request by an authorized user. In one example, the authorized user can be a user that is closely associated with the user device receiving the stream of audio (e.g., the owner or predominant user of the user device). In another example, the authorized user can be a user that is associated with a speech model used in determining the second likelihood at block 106 of process 100. In yet another example, the authorized user can be one of a limited set of enrolled users sharing the user device. The stream of audio can further include background noises, such as, for example, music, mechanical noise, environmental noise, and babble noise. The background noise can overlap at least in part with the user speech.

Figure 2:
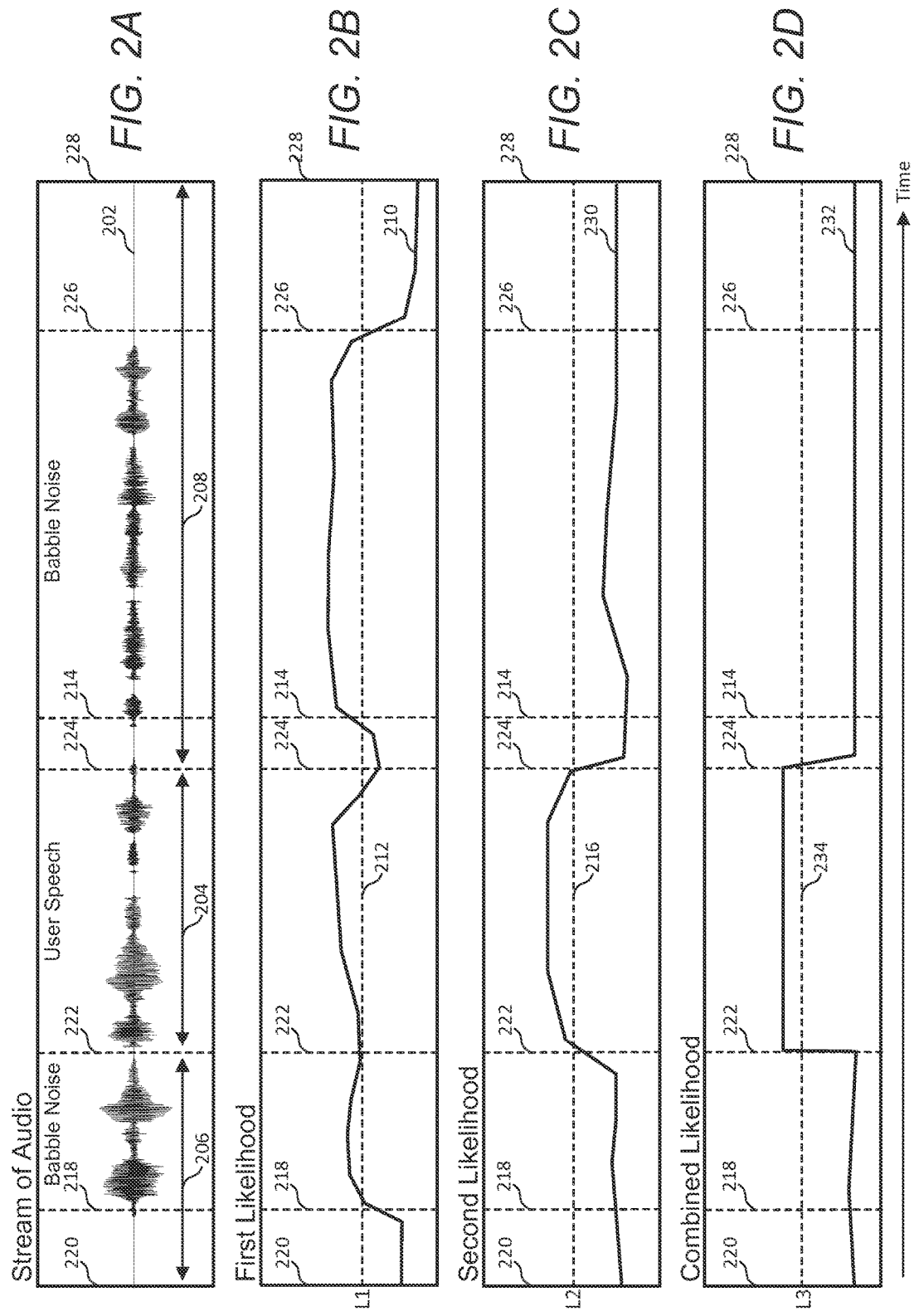
FIG. 2A illustrates a waveform representing an exemplary stream of audio in the time domain according to various examples.
FIG. 2B illustrates a waveform representing an exemplary first likelihood that a stream of audio includes user speech according to various examples.
FIG. 2C illustrates a waveform representing an exemplary second likelihood that a stream of audio includes user speech spoken by an authorized user according to various examples.
FIG. 2D illustrates a waveform representing an exemplary combined likelihood that a stream of audio includes user speech according to various examples.

FIG. 2A illustrates waveform 202 representing an exemplary stream of audio in the time domain that can be received at block 102 of process 100. In this example, the stream of audio includes first part 206, second part 204, and third part 208. As depicted by waveform 202, first part 206 of the stream of audio from time 220 to time 218 can include neither user speech nor babble noise. The remainder of first part 206 from time 218 to time 222 can include babble noise. The babble noise can share the same frequency spectrum as user speech.

As depicted by waveform 202, second part 204 of the stream of audio from time 222 to time 224 can include user speech. In particular, the user speech can include a spoken user request from an authorized user of the user device. In some cases, second part 204 can include babble noise that overlaps with the user speech. In this example, the babble noise of first part 206 and the user speech or babble noise of second part 204 can be continuous. At third part 208 of the stream of audio, babble noise can be minimal from time 224 to time 214 and can become more significant from time 214 to time 226. At time 226, the babble noise can end and the remainder of third part 208 can include neither babble noise nor user speech.

At block 104 of process 100, a first likelihood that the stream of audio includes user speech can be determined. In some examples, the first likelihood can be determined by a user device (e.g., user device 302, described below). In other examples, the first likelihood can be determined by a remote system, such as a server (e.g., server system 310 or virtual assistant server 314, described below). The first likelihood can represent the probability or certainty that the stream of audio includes user speech. The first likelihood can range between an upper limit (e.g., one) and a lower limit (e.g., zero). The upper limit can represent full certainty that the stream of audio includes user speech while the lower limit can represent impossibility that the stream of audio includes user speech.

Determining the first likelihood can be based at least in part on one or more features of the stream of audio, such as, for example, time domain and/or frequency domain features. Time domain features can include, for example, zero crossing rates, short-time energy, spectral energy, spectral flatness, and autocorrelation. Frequency domain features can include, for example, mel-frequency cepstral coefficients, linear predictive cepstral coefficients, and mel-frequency discrete wavelet coefficients.

In some examples, the first likelihood can be determined based at least in part on the energy level of the stream of audio. In one example, the first likelihood can be determined to equal a lower limit based on the energy level being less than or equal to a lower threshold energy level. Similarly, the first likelihood can be determined to equal an upper limit based on the energy level being greater than or equal to an upper threshold energy level. For energy levels between the upper and lower threshold energy levels, the first likelihood can be determined to be between the upper and lower limits, where a higher first likelihood is determined for a higher energy level. In some cases, the energy level can refer to the energy level within a pre-determined frequency range (e.g., spectral energy). The pre-determined frequency range can include, for example, the frequency range of human speech (e.g., 50-500 Hz).

Determining the first likelihood can include comparing one or more features of the stream of audio to one or more pre-determined models. For example, the first likelihood can be based at least in part on a pre-determined silence/background model and a human speech model. Portions of the stream of audio having features that are more comparable to the human speech model can be determined to have a higher first likelihood of including user speech. Conversely, portions of the stream of audio having features that are more comparable to the silence/background model can be determined to have a lower first likelihood of including user speech. The human speech model can be based at least in part on one or more previously received samples of human speech. In one example, the human speech model can be based at least in part on a previously received sample of user speech. Specifically, the human speech model can be a Gaussian Mixture model built using features extracted from one or more audio samples of human speech. The silence/background model can be based at least in part on one or more previously received audio samples of background noise. In one example, the silence/background model can be based at least in part on a first portion of the stream of audio that does not contain user speech (e.g., the first 5-20 ms of the stream of audio). Specifically, the silence/background model can be a Gaussian Mixture model built using features extracted from one or more audio samples of silence and/or background noise. In some examples, the first likelihood can be a log-likelihood ratio based on the outputs of the one or more pre-determined models.

As described above, determining the first likelihood can include performing short-time spectral analysis on the stream of audio. For example, at least a portion of the stream of audio can be divided into frames of audio where each frame of audio has a pre-determined frame width. A frame width refers to the duration of each frame of audio. In one example, the pre-determined frame width of each frame of audio can be 5-40 ms. A frame width of this duration can be advantageous in providing a greater resolution of analysis, thereby enabling greater precision in end-point detection. The frames of audio can be shifted by a predetermined amount such that adjacent frames of audio overlap each other. In one example, the frames of audio can be shifted by about 5-15 ms and adjacent frames of audio can overlap each other by about 15-25 ms. Each frame of audio can be analyzed for user speech based at least in part on one or more time domain or frequency domain features. Accordingly, determining the first likelihood can include determining for each frame of audio of the stream of audio the likelihood that the frame of audio includes user speech. In a specific example, determining the first likelihood can include determining the likelihood that a frame of audio of the multiple frames of audio includes user speech.

FIG. 2B illustrates waveform 210 representing an exemplary first likelihood that can be determined at block 104 of process 100. The first likelihood can be the likelihood that the stream of audio, represented by waveform 202, includes user speech. In this example, the first likelihood can be based at least in part on the energy level of the stream of audio within the frequency range of human speech.

In the present example, first threshold value L1 212 can be a pre-determined threshold value for determining whether the stream of audio includes user speech based on the first likelihood. For example, portions of the stream of audio that have a first likelihood greater or equal to first threshold value L1 212 for longer than a threshold duration can be determined to include user speech.

As depicted by waveform 210, the first likelihood can be determined to be significantly lower than first threshold value L1 212 from time 220 to time 218 when the energy level of the stream of audio is minimal due to an absence of both user speech and babble noise. At time 218, the first likelihood can increase to exceed first threshold value L1 212 due to the presence of babble noise. The babble noise can continue for the remainder of first part 206 and thus the first likelihood can remain above first threshold value L1 212 throughout this time period. As described above, babble noise can contain similar spectral energy as user speech and thus the babble noise during this time period can be falsely determined to be user speech. In addition, if start-pointing were based only on the first likelihood, the transition of the first likelihood from below to above first threshold value L1 212 at time 218 can be falsely identified as the start-point.

At second part 204 of the stream of audio from time 222 to time 224, the first likelihood can be determined to exceed first threshold value L1 212 due to the presence of user speech in the stream of audio. Because the user speech of second part 204 is continuous with the babble noise of first part 206, the first likelihood does not change significantly from time 218 to time 222. As a result, it can be difficult to accurately identify the actual start-point at time 222 based only on the first likelihood.

As depicted by waveform 210, the first likelihood can dip slightly below first threshold value L1 212 from time 224 to time 214 when user speech ends and babble noise is minimal. Because the dip in the first likelihood is brief and not pronounced, it can be difficult to determine whether this dip is a natural pause in user speech or an end-point of user speech. Therefore, based on the first likelihood alone, the actual end-point at time 224 can be difficult to identify.

From time 214 to time 226, the first likelihood can exceed first threshold value L1 212 due to the presence of substantial babble noise in the stream of audio. As described above, babble noise can have similar spectral energy as user speech and thus the babble noise during this time period can be falsely determined to be user speech. At time 226, when babble noise ends and user speech is absent, the first likelihood can decrease to a value significantly below first threshold value L1 212 and remain at the lower value for the remainder of third part 208. If end-pointing were based only on the first likelihood, the transition of the first likelihood from above to below first threshold value L1 212 at time 226 can be falsely identified as the end-point.

Although in this example, the first likelihood can be compared to first threshold value L1 212 to determine whether the stream of audio includes user speech, it should be recognized that in other examples, any predetermined rule or logic condition can be applied to the first likelihood to determine whether the stream of audio includes user speech.

Further, in some examples, the first likelihood can be determined for only a portion or portions of the stream of audio. In one such example, a first portion of the stream of audio can be used to determine a baseline energy level of the stream of audio. The first portion can include a portion of the stream of audio where the likelihood of user speech is inherently low. For example, the first portion can include the first 5-20 ms of the stream of audio. The first likelihood can thus be determined only for a second portion of the stream of audio that is after the first portion. In some cases, the baseline energy level can be used to generate a silence/background model.

At block 106 of process 100, a second likelihood that the stream of audio includes user speech spoken by an authorized user can be determined. In some examples, the second likelihood can be determined by a user device (e.g., user device 302, described below). In other examples, the second likelihood can be determined by a remote system such as, a server (e.g., server system 310 or virtual assistant server 314, described below). The second likelihood can represent the probability or certainty that the stream of audio includes user speech spoken by an authorized user. As described above, an authorized user can be a user that is associated with a speech model used in determining the second likelihood. In some examples, the authorized user can be a user that is closely associated with the user device receiving the stream of audio (e.g., the owner or predominant user of the user device). In other examples, the authorized user can be one of a limited set of enrolled users sharing the user device. In some instances, the limited set of enrolled users is less than 10 users. In other instances, the limited set of enrolled users is less than 5 users.

The second likelihood can be determined by performing speech authentication. For example, determining the second likelihood can include comparing the features of the stream of audio to those of one or more speech models (e.g., Gaussian Mixture models, Hidden Markov models, or Neural Networks). In one example, the second likelihood can be based at least in part on a pre-determined universal background model and a pre-determined speech model of an authorized user. A higher second likelihood can be determined for portions of the stream of audio that are more comparable to the speech model. Conversely, a lower second likelihood can be determined for portions of the stream of audio that are more comparable to the universal background model. The universal background model can represent general human speech characteristics and can be based at least in part on the speech of a variety of people. The speech model can represent the individual speech characteristics of the authorized user and can be based at least in part on the speech of the authorized user. In particular, the speech model can be based at least in part on the speech of the authorized user received prior to receiving the stream of audio. In some examples, the second likelihood can be a log likelihood ratio or a liner logistic regression based on a likelihood comparison between the universal background model and the speech model.

As described above, determining the second likelihood can include dividing the stream of audio into segments of audio having a pre-determined segment width. A segment width refers to the duration of each segment of audio. Adjacent segments can overlap by a pre-determined amount to enable continuous sampling across the stream of audio. In some examples, each segment of audio can be analyzed to determine the likelihood that the segment of audio includes user speech spoken by an authorized user. In these examples, the features of each segment of audio can be analyzed for user speech spoken by an authorized user by comparing the features of the segment of audio to those of one or more speech models. The features of each segment of audio can be time-domain features or frequency domain features. Thus, determining the second likelihood can include determining for each segment of audio, the likelihood that the segment of audio includes user speech spoken by an authorized user. Specifically, determining the second likelihood can include determining the likelihood that a segment of audio of the multiple segments of audio includes user speech.

In other examples, each segment of audio can include multiple frames of audio. In these examples, each frame of audio within each segment of audio can be analyzed to determine the likelihood that the frame of audio includes user speech spoken by an authorized user. The likelihood that a segment of audio includes user speech spoken by an authorized user can then be determined based on the determined likelihoods of the frames of audio within each segment of audio. In one such example, the likelihood that a segment of audio includes user speech spoken by an authorized user can be determined by averaging the determined likelihoods of the frames of audio within the segment of audio.

The segment width can affect the confidence in the second likelihood determined and the precision of start-pointing or end-pointing. A segment width that is less than 50 ms can result in significant noise in each segment of audio and thus poor confidence in the second likelihood determined. However, a segment width that is greater than 500 ms can result in poor resolution of analysis and thus greater uncertainty in start or end-pointing. In one example, the pre-determined segment width for determining the second likelihood can be at least five times greater than the pre-determined frame width for determining the first likelihood. In another example, the pre-determined segment width of each segment of audio can be 100-300 ms.

FIG. 2C illustrates waveform 230 representing an exemplary second likelihood that can be determined at block 106 of process 100. The second likelihood represented by waveform 230 can be the likelihood that the stream of audio, represented by waveform 202, includes user speech spoken by an authorized user. In this example, the second likelihood can be based at least in part on one or more speech models such as, for example, a pre-determined universal background model and a pre-determined speech model of the authorized user.

In the present example, second threshold value L2 216 can be a pre-determined threshold value for determining whether the stream of audio includes user speech spoken by the authorized user based on the second likelihood. For example, portions of the stream of audio that have a second likelihood greater or equal to second threshold value L2 216 for longer than a threshold duration can be determined to include user speech spoken by the authorized user.

As depicted by waveform 230, the second likelihood can be significantly lower than second threshold value L2 216 for most of first part 206 of the stream of audio from time 220 to time 222. Notably, unlike the first likelihood, the second likelihood can remain significantly lower than second threshold value L2 216 despite the presence of babble noise in the stream of audio between time 218 and time 222. As previously described, the speech characteristics of babble noise can be sufficiently different from the speech characteristics of the authorized user. Therefore, the second likelihood can be low during this time period because the babble noise in the stream of audio poorly matches the speech model of the authorized user.

At time 222, the second likelihood can increase to exceed second threshold value L2 216 as babble noise ceases and user speech begins. The speech characteristics of the user speech can closely match with those of the speech model of the authorized user. Therefore, as depicted by waveform 230, the second likelihood can remain above second threshold value L2 216 from time 222 to time 224 when the stream of audio includes user speech of the authorized person.

As depicted by waveform 230, the second likelihood can drop significantly below second threshold value L2 216 at time 224 when user speech ends. Notably, unlike the first likelihood, the second likelihood can remain low from time 214 to time 226 even when babble noise is significant. As previously described, the speech characteristics of babble noise can be sufficiently different from the speech characteristics of the authorized user. Therefore, the second likelihood can be low during this period because the babble noise in the stream of audio poorly matches the speech model of the authorized user.

Although in this example, the second likelihood can be compared to second threshold value L1 212 to determine whether the stream of audio includes user speech spoken by an authorized user, it should be recognized that in other examples, any predetermined rule or logic condition can be applied to the second likelihood to determine whether the stream of audio includes user speech spoken by an authorized user.

Further, in some examples, the second likelihood can be determined only for a portion or portions of the stream of audio. The portion or portions of the stream of audio for which the second likelihood is determined can be based at least in part on the first likelihood. In one example, the first likelihood can be determined to exceed an upper threshold for longer than a threshold duration beginning from a first time. In such an example, the second likelihood can be determined only for the portion the stream of audio that is after the first time. In another example, second likelihood can be determined only in portions of the stream of audio for which the first likelihood is determined to exceed an upper threshold value for longer than a threshold duration.

In some examples, determining the first likelihood and the second likelihood can begin at separate times. In one such example, determining the second likelihood can begin after the first likelihood is determining for a portion of the stream of audio. Specifically, the second likelihood that any segment of audio includes user speech spoken by an authorized user can be determined only after the first likelihood that a frame of audio includes user speech is determined.

In other examples, the second likelihood can be determined only when a pre-determined condition is met. In one such example, the second likelihood can be determined in response to the energy level of the stream of audio exceeding a threshold energy level for longer than a threshold duration limit. In another example, the second likelihood can be determined in response to the first likelihood exceeding an upper threshold level for longer than a threshold duration. In yet another example, speaker authentication can be performed on the stream of audio in response to the energy level of the stream of audio exceeding a threshold energy level for longer than a threshold duration. Performing speaker authentication can include determining a second likelihood that the stream of audio includes user speech spoken by an authorized user.

At block 108 of process 100, a start-point or end-point of the spoken user request can be identified based at least in part on the first likelihood and the second likelihood. In some examples, block 108 can be performed by a user device (e.g., user device 302, described below). In other examples, block 108 can be performed by a remote system such as a server (e.g., server system 310 or virtual assistant server 314, described below). As previously described, the first likelihood and the second likelihood can provide a greater knowledge base and thus the start-point or end-point can be identified more accurately and robustly.

In some examples, a combined likelihood can be determined based at least in part on the first likelihood and the second likelihood. The combined likelihood can represent the probability or certainty that the stream of audio includes user speech spoken by an authorized user. The combined likelihood can be a mathematical combination of the first likelihood and the second likelihood where the combined likelihood is a function of the first likelihood and the second likelihood. In some examples, the combined likelihood can be the weighted average of the first likelihood and the second likelihood. In calculating the weighted average, the weight applied to the first likelihood can be different from the weight applied to the second likelihood. Alternatively, the weight applied to the first likelihood can be equal to the weight applied to the second likelihood. The weights applied to the first likelihood and the second likelihood can vary depending on the device used to perform process 100.

In some examples, the weights applied to the first likelihood and the second likelihood in determining the combined likelihood can vary based on the relative values of the first likelihood and the second likelihood. For example, greater weight can be applied to the first likelihood compared to the second likelihood when the second likelihood is confirmatory of the first likelihood. One example of the second likelihood being confirmatory of the first likelihood is when the second likelihood transitions across a second threshold value within a predetermine duration (e.g., 100-800 ms) before or after the first likelihood transitioning across a first threshold value. Applying greater weight to the first likelihood can enable the combined likelihood to be more precise due to the more precise nature of the first likelihood. In another example, greater weight can be applied to the second likelihood compared to the first likelihood when the second likelihood is contradictory to the first likelihood. One example of the second likelihood contradicting the first likelihood is when the second likelihood does not transition across a second threshold value within a predetermine duration (e.g., 100-800 ms) before or after the first likelihood transitioning across a first threshold value. Applying greater weight to the second likelihood can enable the combined likelihood to be more accurate due to the more accurate nature of the second likelihood.

The start-point or end-point of the spoken user request can be identified based on the combined likelihood. In one example, the start-point or end-point can be identified based in part on comparing the combined likelihood to a pre-determined threshold value. For example, the start-point can be identified based on the time at which the combined likelihood transitions from below to above a pre-determined threshold value and remains above the pre-determined threshold value for longer than a pre-determined duration. Similarly, the end-point can be identified based on the time at which the combined likelihood transitions from above to below a pre-determined threshold value and remains below the pre-determined threshold value for longer than a pre-determined duration. In another example, the start-point or end-point can be identified based in part on the rate of change of the combined likelihood. For example, the start-point can be based on the time at which the combined likelihood increases more than a pre-determined amount within a pre-determined duration. Similarly, the end-point can be identified based on the time at which the combined likelihood decreases more than a pre-determined amount within a pre-determined duration. It should be appreciated that any suitable predetermined rule or logic condition can be applied to the combined likelihood to identify a start-point or end-point of the spoken user request.

With reference to FIG. 2D, waveform 232 can represent the combined likelihood of the first likelihood (FIG. 2B) and the second likelihood (FIG. 2C). Identifying the start-point or end-point at block 108 of process 100 can be based at least in part on the combined likelihood represented by waveform 232. In the present example, a start-point or end-point can be identified based on comparing the combined likelihood to third threshold value L3 234. For example, as described above, the start-point can be identified based on the time at which the combined likelihood transitions from below to above third threshold value L3 234 and remains above third threshold value L3 234 for longer than a pre-determined duration. Similarly, the end-point can be identified based on the time at which the combined likelihood transitions from above to below third threshold value L3 234 and remains below third threshold value L3 234 for longer than a pre-determined duration.

Waveform 232 can be described with simultaneous reference to FIGS. 2B-D. From time 220 to time 218, the first likelihood (waveform 210) and the second likelihood (waveform 230) can be significantly lower than first threshold value L1 212 and second threshold value L2 216, respectively. Initial weightings can be applied to the first likelihood and the second likelihood to determine the combined likelihood. The initial weighting applied to the first likelihood can be equal to or different from that applied to the second likelihood. As depicted by waveform 232, the combined likelihood can be determined to be significantly lower than third threshold value L3 234 from time 220 to time 218 based on the first likelihood and the second likelihood.

At time 218, when babble noise commences, the first likelihood can transition from below to above first threshold value L1 212 and remain above first threshold value L1 212 from time 218 to time 222. During this period, the second likelihood can remain significantly lower than second threshold value L2 216 due to the poor match between babble noise and the speech model of the authorized user. The second likelihood thus can contradict the first likelihood where the second likelihood does not transition from below to above second threshold value L2 216 within a pre-determine duration before or after time 218. As a result, beginning at time 218, or at a time 50-500 ms prior to time 218, greater weight can be applied to the second likelihood compared to the first likelihood in determining the combined likelihood. Accordingly, the combined likelihood can be determined to remain significantly lower than third threshold value L3 234 from time 218 to time 222 despite the first likelihood exceeding first threshold value L1 212 during this period.

At time 222, when user speech begins, the second likelihood can transition from below to above second threshold value L2 216 as a result of the user speech sufficiently matching the speech model of the authorized user. Due to the greater weight applied to the second likelihood, the combined likelihood can be determined to increase from below to above third threshold value L3 234 at time 222. As depicted by waveform 232, the combined likelihood can remain above third threshold value L3 234 throughout second part 204 based on the first likelihood and the second likelihood being above first threshold value L1 212 and the second likelihood, respectively, during this period. The start-point of the spoken user request in the stream of audio can be accurately identified as time 222 based on the combined likelihood transitioning from below to above third threshold value L3 234 at time 222 and remaining above third threshold value L3 234 for longer than a pre-determine duration.

At time 224, when user speech ends, the first likelihood can dip slightly such that it transitions from above to below first threshold value L1 212. The second likelihood is confirmatory of the first likelihood where the second likelihood transitions from above to below second threshold value L2 216 within a predetermine duration before or after time 224. Thus, beginning at time 224, or at a time 50-500 ms prior to time 224, greater weight can be applied to the first likelihood compared to the second likelihood in determining the combined likelihood. This can be desirable in enabling greater precision for start-point or end-point detection. As depicted by waveform 232, the combined likelihood can be determined to transition from above to below third threshold value L3 234 at time 224 and remain below third threshold value L3 234 from time 224 to time 214. The end-point of the spoken user request in the stream of audio can thus be accurately identified as time 224 based on the combined likelihood transitioning from above to below third threshold value L3 234 at this time and remaining below third threshold value L3 234 for longer than a pre-determine duration.

At time 214, the first likelihood can transition from below to above first threshold value L1 212 due to the presence of babble noise. In contrast, the second likelihood can remain significantly below second threshold value L2 216 at time 214 due to the poor match between babble noise and the speech model of the authorized user. The second likelihood thus contradicts the first likelihood where the second likelihood does not transition from below to above second threshold value L2 216 within a pre-determine duration before or after time 214. Thus, beginning at time 214, or at a time 50-500 ms prior to time 214, greater weight can be applied to the second likelihood compared to the first likelihood in determining the combined likelihood. This can be desirable in enabling greater accuracy for start-point or end-point detection. Accordingly, the combined likelihood can be determined to remain significant lower than third threshold value L3 234 from time 214 to time 226 despite the first likelihood exceeding first threshold value L1 212 during this period.

At time 226, when the babble noise ends, the first likelihood can transition from above to below first threshold value L1 212 and remain below first threshold value L1 212 for the remainder of part 208. The second likelihood remains significantly below second threshold value L2 216 throughout third part 208. As depicted by waveform 232, the combined likelihood can be determined to remain significantly below third threshold value L3 234 from time 226 to time 228 based on the first likelihood and the second likelihood being significantly below first threshold value L1 212 and second threshold value L2 216, respectively, during this period.

Although in the above example, the weightings applied to the first likelihood and the second likelihood for determining the combined likelihood can vary across the stream of audio based on whether the second likelihood confirmed or contradicted with the first likelihood, it should be recognized that in other examples, the weightings can be based on various other factors require to optimize the accuracy and precision of start-point and end-point detection. In some examples, the weightings applied to the first likelihood and the second likelihood can be constant across the stream of audio. In addition, it should be recognized that various other suitable definitions can be utilized to determine whether the second likelihood is confirmatory or contradictory to the first likelihood.

Further, it should be recognized that identifying the start-point or end-point based at least in part on the first likelihood and the second likelihood can be more favorable when the spoken user request is made by an authorized user. When the spoken user request is made by a non-authorized user, identifying the start-point and end-point based at least in part on the first likelihood and the second likelihood can yield less desirable results. This can be because the second likelihood distinguishes speech spoken by an authorized user from other human speech and thus a spoken user request by a non-authorized user can result in a low second likelihood and thus a low combined likelihood. Therefore, identifying the start-point or end-point based at least in part on the first likelihood and the second likelihood can be less suitable for devices having a large population of generic users and more suitable for devices where a limited number of authorized users are closely associated with the device (e.g., personal mobile devices).

Although blocks 102, 104, 106, and 108 of process 100 are shown in a particular order in FIG. 1, it should be appreciated that these blocks can be performed in any order. For instance, in some examples, block 106 can be performed prior to block 104. Further, although process 100 is described above with reference to blocks 102, 104, 106, and 108, it should be appreciated that in some cases, one or more blocks of process 100 can be optional and additional blocks can also be performed. For instance, in some examples, process 100 can include receiving a signal to begin recording a stream of audio. In one example, receiving a stream of audio at block 102 can be performed in response to receiving a signal to begin recording the stream of audio. In a specific example, receiving the stream of audio at block 102 can be performed by a user device in response to the user device receiving the signal to begin recording the stream of audio.

In other examples, process 100 can include receiving a signal to stop recording the stream of audio at block 102. In one example, receiving the stream of audio at block 102 can stop in response to receiving a signal to stop recording. In a specific example, a user device can stop receiving a stream of audio at block 102 in response to the user device receiving a signal to stop recording. In one example, the signal to stop recording can be received in response to identifying an end-point of the spoken user request. In another example, the signal to stop recording can be received in response to the stream of audio at block 102 exceeding a pre-determined duration. The stream of audio can refer to the audio input received by the user device from the time the signal to start recording is received to the time the signal to stop recording is received.

In addition, process 100 can include determining a baseline energy level of the stream of audio based on an energy level of a first portion of the stream of audio. For example, the baseline energy level can be determined based on an energy level for the first 5-20 ms of the stream of audio when the likelihood of user speech is inherently low. In some examples, determining the first likelihood at block 104 can be based on an energy level of a second portion of the stream of audio. The second portion can be a portion of the stream of audio that is after the first portion of the stream of audio.

In some examples, process 100 can further include performing speaker authentication on the second portion of the stream of audio in response to the baseline energy level exceeding a threshold energy level. Speaker authentication can be performed to determine the second likelihood that the stream of audio includes speech spoken by an authorized user. In some cases, speaker authentication can include determining the second likelihood that the stream of audio includes speech spoken by an authorized user.

As described above, with reference to block 106 of process 100, the second likelihood can be determined based at least in part on one or more speech models, such as, for example, a universal background model and a speech model of an authorized user. In some cases, process 100 can include updating the speech model based at least in part on a portion of the stream of audio. For example, the start-point or end-point of the spoken user request can be identified based at least in part on the first likelihood and the second likelihood. The speech model of the authorized user can then be updated based at least in part on the spoken user request.

2. System and Environment

Figure 3:
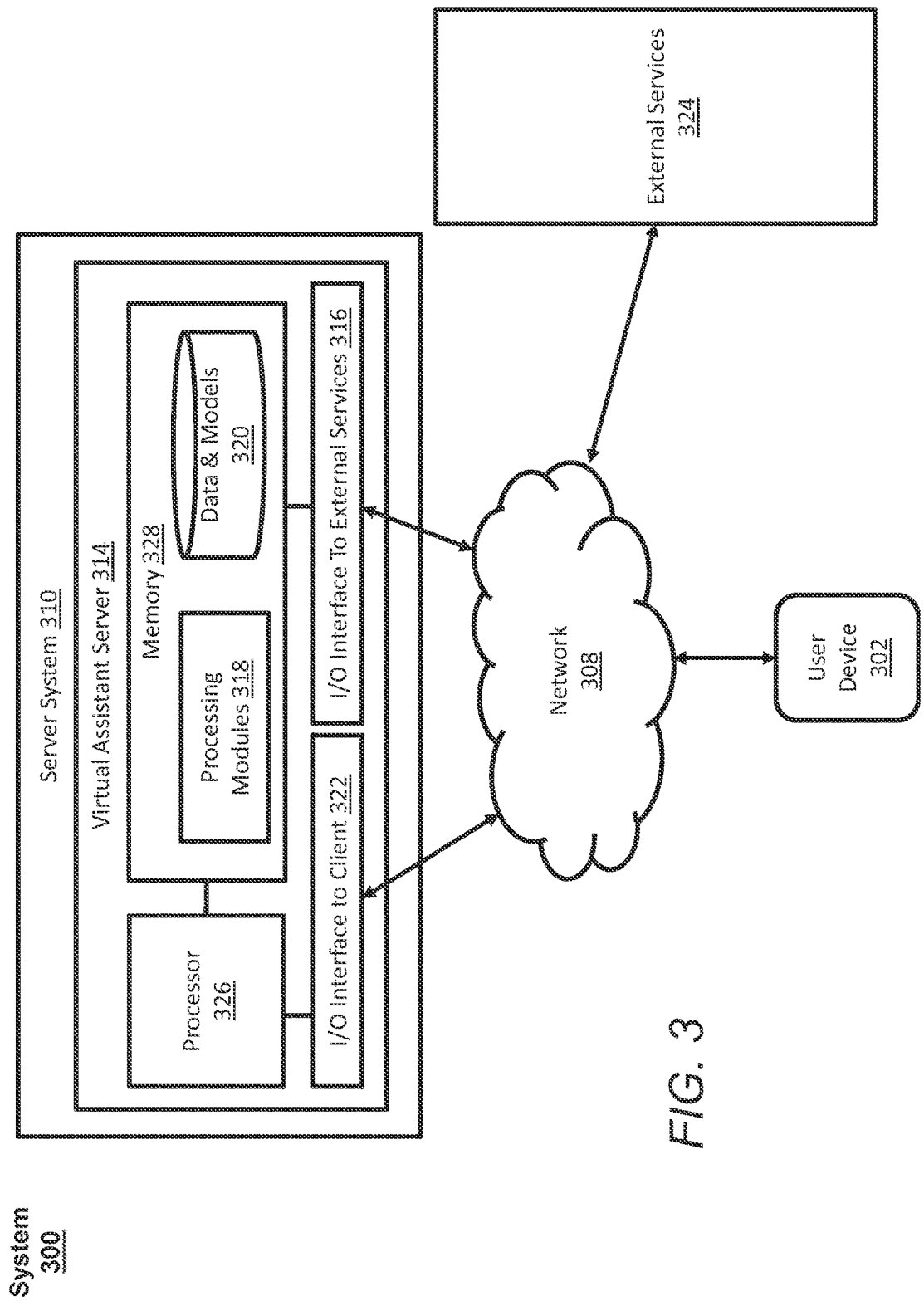
FIG. 3 illustrates an exemplary system and environment for carrying out aspects of robust end-pointing of speech signals using speaker recognition according to various examples.

FIG. 3 illustrates exemplary system 300 for carrying out various aspects of analyzing audio input for efficient speech and music recognition according to various examples. System 300 can be capable of robust start-pointing or end-pointing of speech signals using speaker recognition. In particular, system 300 can be capable of identifying a start-point or end-point of a spoken user request in a stream of audio. For example, system 300 can implement a virtual assistant capable of performing process 100 described above. The terms "virtual assistant," "digital assistant," "intelligent automated assistant," or "automatic digital assistant," can refer to any information processing system (e.g., system 300) that can interpret natural language input in spoken and/or textual form to infer user intent, and perform actions based on the inferred user intent.

A virtual assistant can be capable of analyzing a stream of audio that includes a spoken user request. Specifically, the virtual assistant can identify a start-point or an end-point of the spoken user request and performing speech recognition on the spoken user request in order to obtain a textual representation of the spoken user request. The textual representation can be analyzed to infer user intent. The virtual assistant can then act on the inferred user intent by performing one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

An example of a virtual assistant is described in Applicants' U.S. Utility application Ser. No. 12/987,982 for "Intelligent Automated Assistant," filed Jan. 10, 2011, the entire disclosure of which is incorporated herein by reference As shown in FIG. 3, in some examples, a virtual assistant can be implemented according to a client-server model. The virtual assistant can include a client-side portion executed on user device 302, and a server-side portion executed on a server system 310. User device 302 can include any electronic device, such as a mobile phone, tablet computer, portable media player, desktop computer, laptop computer, PDA, television, television set-top box, wearable electronic device, or the like, and can communicate with server system 310 through one or more networks 308, which can include the Internet, an intranet, or any other wired or wireless public or private network. A detailed description of user device 302 is provided below with reference to FIG. 4. The client-side portion executed on user device 302 can provide client-side functionalities, such as user-facing input and output processing and communications with server system 310. Server system 310 can provide server-side functionalities for any number of clients residing on a respective user device 302.

Server system 310 can include one or more virtual assistant servers 314. As shown in FIG. 3, virtual assistant server 314 includes memory 328, one or more processors 326, client-facing I/O interface 322, and I/O interface to external services 316. The various components of virtual assistant server 314 can be coupled together by one or more communication buses or signal lines. Memory 328, or the computer readable storage media of memory 328, can include one or more processing modules 318 and data and model storage 320. The one or more processing modules 318 can include various programs and instructions. The one or more processors 326 can execute the programs and instructions of the one or more processing modules 328 and read/write to/from data and model storage 320. In the context of this document, a "non-transitory computer readable storage medium" can be any medium that can contain or store the program for use by or in connection with the instruction execution system, apparatus, or device.

In some examples, the one or more processing modules 318 can include various programs and instructions for performing various aspects of process 100 described above. In particular, the one or more processing modules 318 can include an audio preprocessing module, a speech-to-text processing module, a natural language processing module, a task flow processing module, and a service processing module. The audio preprocessing module can include instructions for performing the various aspects of process 100 described above. The speech-to-text processing module can include instructions for transcribing a speech utterance in an audio input and the natural language processing module can include instructions for inferring user intent from the transcribed speech utterance. The task flow processing module and the service processing module can include instructions for identifying a task flow to accomplish the inferred user intent, inputting specific requirements from the inferred user intent into the task flow, executing the task flow, and generating output responses relevant to the speech utterance. Data and models 320 can include various user data and models (e.g., human speech models, speech models of authorized users, silence/background models, universal background models, task flow models, and service models) that can be accessed or referenced when performing various aspects of process 100.

In some examples, virtual assistant server 314 can communicate with external services 324, such as telephony services, calendar services, information services, messaging services, navigation services, and the like, through network(s) 308 for task completion or information acquisition. The I/O interface to external services 316 can facilitate such communications. Server system 310 can be implemented on one or more standalone data processing devices or a distributed network of computers. In some examples, server system 310 can employ various virtual devices and/or services of third party service providers (e.g., third-party cloud service providers) to provide the underlying computing resources and/or infrastructure resources of server system 310.

Although in this example, system 300 is described as being capable of performing various aspects of process 100 via a virtual assistant, it should be recognized that in other examples, system 300 can implement various other speech processing applications that are capable of performing various aspects of process 100.

Further, although the functionality of the virtual assistant is shown in FIG. 3 as including both a client-side portion and a server-side portion, in some examples, the functions of the assistant, including the functions of process 100 described above, can be implemented as a standalone application installed on a user device. In addition, the division of functionalities between the client and server portions of the virtual assistant can vary in different examples. For instance, in some examples, one or more processing modules 318 and data and models 320 can be stored in the memory of user device 302 to enable user device 302 to perform a greater proportion or all of the functionalities associated with the virtual assistant (and process 100). In other examples, the client executed on user device 302 can be a thin-client that provides only user-facing input and output processing functions, and delegates all other functionalities of the virtual assistant (and process 100) to a backend server.

3. User Device

Figure 4:
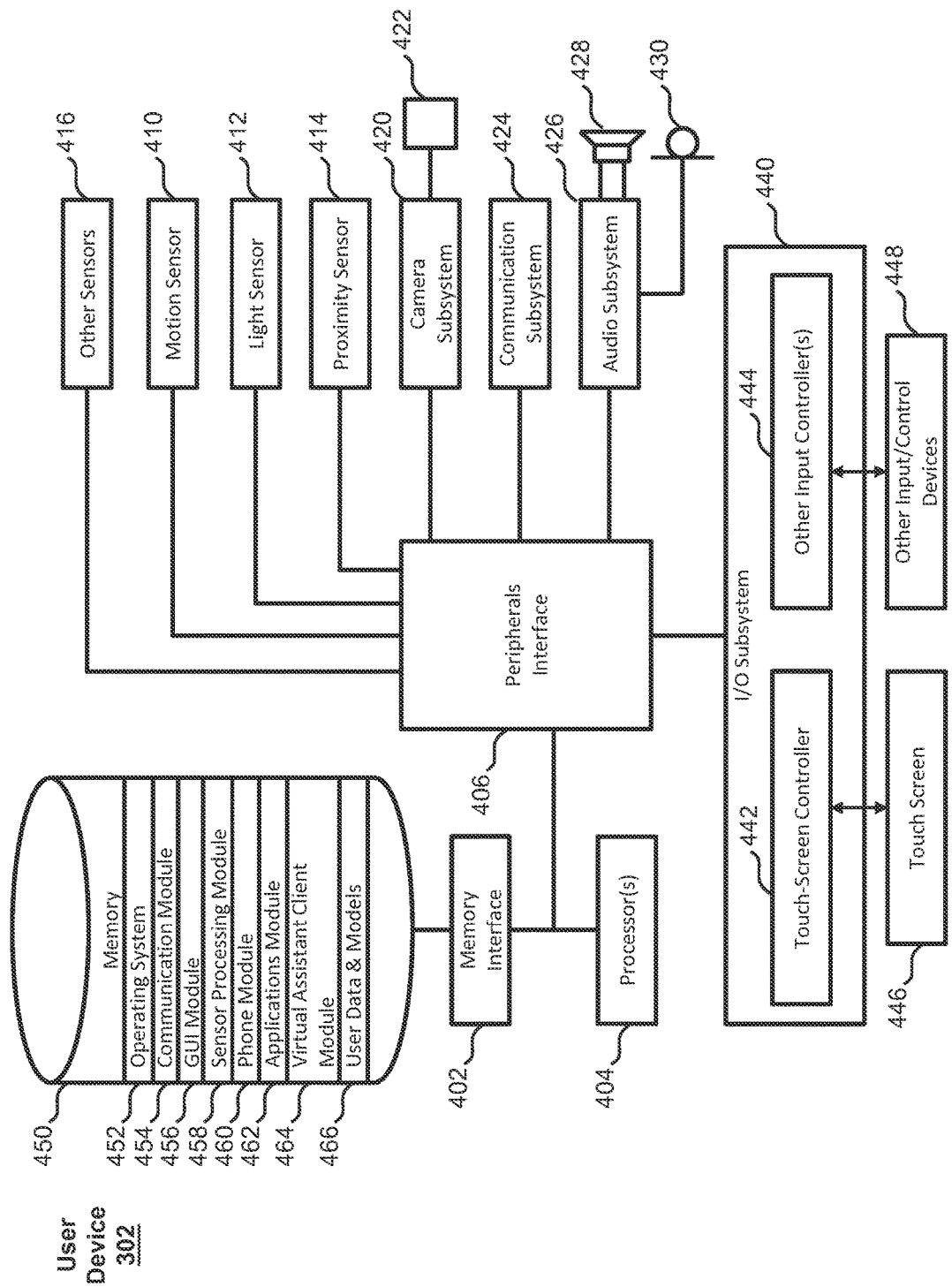
FIG. 4 illustrates an exemplary user device for carrying out aspects of robust end-pointing of speech signals using speaker recognition according to various examples.

FIG. 4 is a block diagram of user-device 302 according to various examples. As shown, user device 302 can include memory interface 402, one or more processors 404, and peripherals interface 406. The various components in user device 302 can be together coupled by one or more communication buses or signal lines. User device 302 can further include various sensors, subsystems, and peripheral devices that are coupled to the peripherals interface 406. The sensors, subsystems, and peripheral devices gather information and/or facilitate various functionalities of user device 302.

For example, user device 302 can include motion sensor 410, light sensor 412, and proximity sensor 414 coupled to peripherals interface 406 to facilitate orientation, light, and proximity sensing functions. One or more other sensors 416, such as a positioning system (e.g., a GPS receiver), a temperature sensor, a biometric sensor, a gyroscope, a compass, an accelerometer, and the like, are also connected to peripherals interface 406, to facilitate related functionalities In some examples, camera subsystem 420 and an optical sensor 422 can be utilized to facilitate camera functions, such as taking photographs and recording video clips. Communication functions can be facilitated through one or more wired and/or wireless communication subsystems 424, which can include various communication ports, radio frequency receivers and transmitters, and/or optical (e.g., infrared) receivers and transmitters. An audio subsystem 426 can be coupled to speakers 428 and microphone 430 to facilitate audio-enabled functions, such as voice recognition, music recognition, voice replication, digital recording, and telephony functions. For example, user-device 302 can received a stream of audio at block 102 of process 100 via microphone 430. Microphone 430 can convert the stream of audio into a representative audio signal (digital or analog). The representative audio signal can be temporarily stored in a memory buffer before undergoing audio analysis or processing. The memory buffer can include memory 450 or can include separate memory of audio subsystem 426.

In some examples, user device 302 can further include an I/O subsystem 440 coupled to peripherals interface 406. I/O subsystem 440 can include touch screen controller 442 and/or other input controller(s) 444. Touch-screen controller 442 can be coupled to touch screen 446. Touch screen 446 and the touch screen controller 442 can, for example, detect contact and movement or break thereof using any of a number of touch sensitivity technologies, such as capacitive, resistive, infrared, surface acoustic wave technologies, proximity sensor arrays, and the like. Other input controller(s) 444 can be coupled to other input/control devices 448, such as one or more buttons, rocker switches, a thumb-wheel, an infrared port, a USB port, and/or a pointer device such as a stylus. In some examples, a signal to begin or stop receiving an audio input can be received by user device 302 via input to touch screen 446 (e.g., a virtual button) or other input/control devices 448.

In some examples, user device 302 can further include memory interface 402 coupled to memory 450. Memory 450 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 450 can be used to store instructions (e.g., for performing process 100, described above) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing process 100, described above) can be stored on a non-transitory computer-readable storage medium of server system 310, or can be divided between the non-transitory computer-readable storage medium of memory 450 and the non-transitory computer-readable storage medium of server system 310.

In some examples, memory 450 can store operating system 452, communication module 454, graphical user interface module 456, sensor processing module 458, phone module 460, and applications 462. Operating system 452 can include instructions for handling basic system services and for performing hardware dependent tasks. Communication module 454 can facilitate communicating with one or more additional devices, one or more computers and/or one or more servers. Graphical user interface module 456 can facilitate graphic user interface processing. Sensor processing module 458 can facilitate sensor related processing and functions. Phone module 460 can facilitate phone-related processes and functions. Application module 462 can facilitate various functionalities of user applications, such as electronic-messaging, web browsing, media processing, navigation, imaging and/or other processes and functions.

As described herein, memory 450 can also store client-side virtual assistant instructions (e.g., in virtual assistant client module 464) and various user data and models 466 to provide the client-side functionalities of the virtual assistant. User data and models 466 can include user-specific vocabulary data, preference data, and/or other data such as the user's electronic address book, to-do lists, shopping lists, and the like. In addition, user data and models 466 can include human speech models, speech models of authorized users of user device 302, silence/background models, universal background models, task flow models, and service models. The virtual assistant client module 464 can include modules, instructions, and programs for performing various aspects of process 100 described above. In some cases, the instructions for performing various aspects of process 100 can be stored in a separate module in memory 450. For instance, application module can include programs utilizing speech processing. Such programs can include instructions for performing various aspects of process 100.

In various examples, virtual assistant client module 464 can include instructions for accepting audio input (e.g., speech and/or music input), text input, touch input, and/or gestural input through various user interfaces (e.g., I/O subsystem 440, audio subsystem 426, or the like) of user device 104. Virtual assistant client module 464 can also include instructions for providing output in audio (e.g., speech and/or music output), visual, and/or tactile forms. For example, output can be provided as voice, music, sound, alerts, text messages, menus, graphics, videos, animations, vibrations, and/or combinations of two or more of the above. During operation, user device 302 can communicate with the virtual assistant server using communication subsystems 424 to perform the functionalities associated with the virtual assistant.

In various examples, memory 450 can include additional instructions or fewer instructions. Furthermore, various functions of user device 302 can be implemented in hardware and/or in firmware, including in one or more signal processing and/or application specific integrated circuits.

4. Electronic Device

Figure 5:
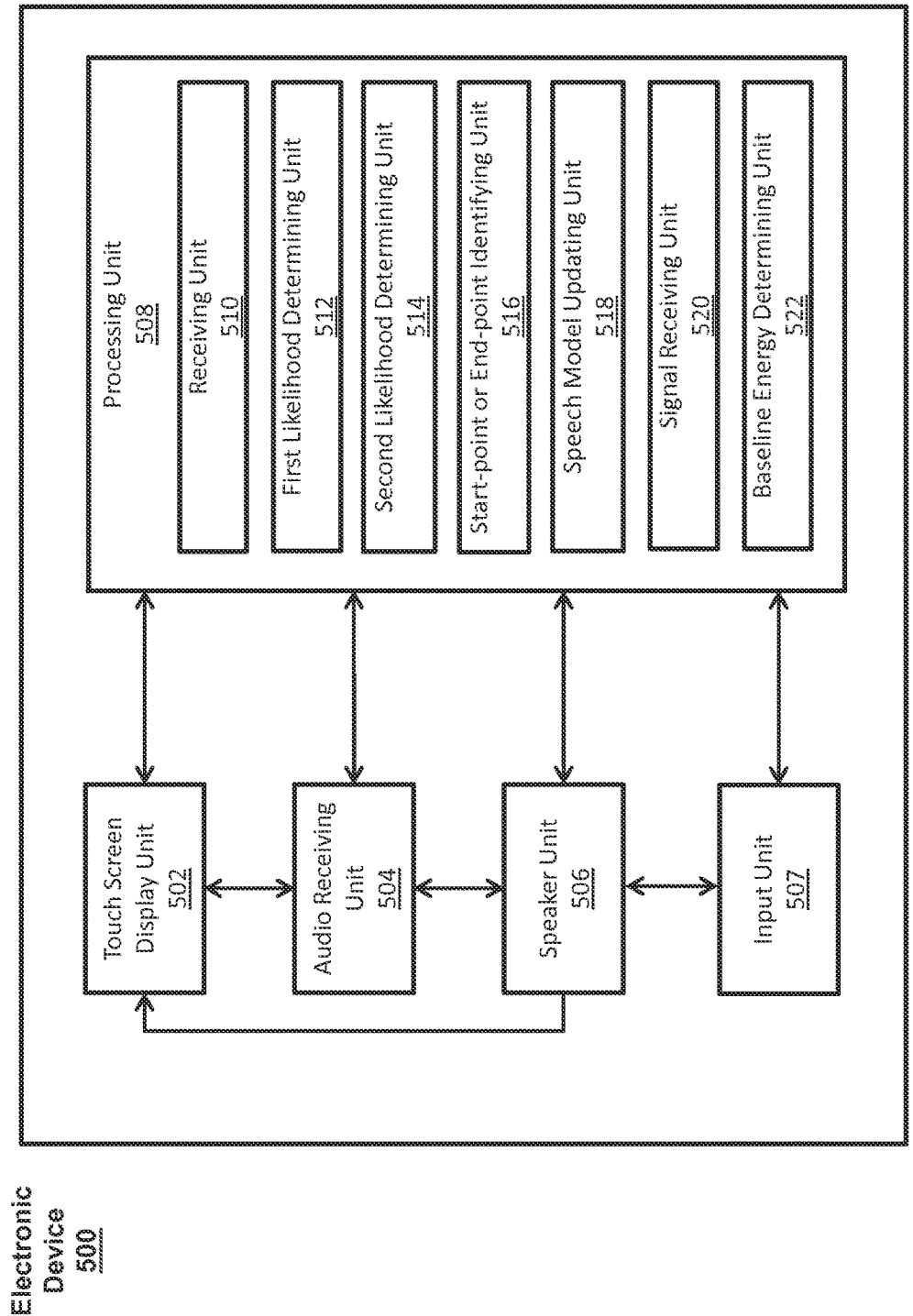
FIG. 5 illustrates a functional block diagram of an exemplary electronic device according to various examples.

FIG. 5 shows functional block diagram of electronic device 500 configured in accordance with the principles of the various described examples. The functional blocks of the device can be, optionally, implemented by hardware, software, or a combination of hardware and software to carry out the principles of the various described examples. It is understood by persons of skill in the art that the functional blocks described in FIG. 5 can be, optionally, combined or separated into sub-blocks to implement the principles of the various described examples. Therefore, the description herein optionally supports any possible combination or separation or further definition of the functional blocks described herein.

As shown in FIG. 5, electronic device 500 can include touch screen display unit 502 configured to display a user interface and to receive touch input, and audio receiving unit 504 configured to receive audio input. In some examples, electronic device 500 can include speaker unit 506 configured to generate sound and input unit 507 configured to receive user input and to generate a signal in response to receiving a user input. For example, the signal can be a signal to begin recording an audio input using audio receiving unit 504. Electronic device 500 can further include processing unit 508 coupled to touch screen display unit 502 and audio receiving unit 504 (and, optionally, coupled to speaker unit 506 and input unit 507). In some examples, processing unit 508 can include receiving unit 510, first likelihood determining unit 512, second likelihood determining unit 514, and start-point or end-point identifying unit 516. In some examples, processing unit 508 can further include speech model updating unit 518, signal receiving unit 520 and baseline energy determining unit 522.

Processing unit 508 can be configured to receive a stream of audio that includes a spoken user request (e.g., from audio receiving unit 504 and using receiving unit 510). Processing unit 508 can be configured to determine a first likelihood (e.g., using first likelihood determining unit 512) that the stream of audio includes user speech. Processing unit 508 can be configured to determine a second likelihood (e.g., using second likelihood determining unit 514) that the stream of audio includes user speech spoken by an authorized user of electronic device 500. Processing unit 508 can further be configured to identify a start-point or an end-point of the spoken user request (e.g., using start-point or end-point identifying unit 516) based at least in part on the first likelihood and the second likelihood.

In some examples, the stream of audio can include multiple frames of audio. In these examples, processing unit 508 can be configured to determine (e.g., using first likelihood determining unit 512) a likelihood that a frame of audio of the multiple frames of audio includes user speech. Further, the stream of audio can include multiple segments of audio. In these examples, processing unit 508 can be configured to determine (e.g., using second likelihood determining unit 514) a likelihood that a segment of audio of the multiple segments of audio includes user speech spoken by the authorized user. In some examples, the duration of the segment of audio can be longer than the duration of the frame of audio. In one such example, the duration of the segment of audio can be at least five times longer than the duration of the frame of audio.

In some examples, determining the likelihood that the frame of audio includes user speech can be performed prior to determining the likelihood that any segment of audio of the multiple segments of audio includes user speech spoken by the authorized user.

In some examples, the first likelihood can be based at least in part on an energy level of the stream of audio.

In some examples, the second likelihood can be based at least in part on a speech model of the authorized user. The speech model can be based at least in part on speech of the authorized user received prior to receiving the stream of audio. In some examples, processing unit 508 can be configured to update the speech model (e.g., using speech model updating unit 518) based at least in part on a portion of the stream of audio.

In some examples, the authorized user can be one of several authorized users of electronic device 500.

In some examples, processing unit 508 can be configured to determine a first likelihood that the stream of audio includes user speech (e.g., using first likelihood determining unit 512) based at least in part on an energy level of the stream of audio. In response to the energy level exceeding a threshold energy level for longer than a threshold duration, processing unit 508 can be configured to performing speaker authentication on the stream of audio (e.g., using second likelihood determining unit 514) to determine a second likelihood that the stream of audio includes speech spoken by an authorized user of the electronic device. Processing unit 508 can be configured to identify a start-point or an end-point of the spoken user request (e.g., using start-point or end-point identifying unit 516) based at least in part on the first likelihood and the second likelihood.

In some examples, processing unit 508 can be configured to receive a signal (e.g., generated by input unit 507 and using signal receiving unit 520) to begin recording an audio input or a stream of audio that includes the spoken user request. Processing unit 508 can be configured to determine a baseline energy level of the audio input (e.g., using baseline energy determining unit 522) based on an energy level of a first portion of the audio input. Processing unit 508 can be configured to determine a first likelihood (e.g., using first likelihood determining unit 512) that the audio input comprises user speech based on an energy level of a second portion of the audio input. In response to the baseline energy level exceeding a threshold energy level, processing unit 508 can be configured to perform speaker authentication on the second portion of the audio input (e.g., using second likelihood determining unit 514) to determine a second likelihood that the audio input comprises speech spoken by an authorized user of the electronic device. Processing unit 508 can be configured to identify a start-point or an end-point of the spoken user request (e.g., using start-point or end-point identifying unit 516) based at least in part on the first likelihood and the second likelihood.

Although examples have been fully described with reference to the accompanying drawings, it is to be noted that various changes and modifications will become apparent to those skilled in the art. Such changes and modifications are to be understood as being included within the scope of the various examples as defined by the appended claims.

In some cases, the systems, processes, and devices described above can include the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data in connection with the systems, processes, and devices described above, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the systems and devices described above can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples disclosed herein are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method for identifying a start-point or an end-point of a spoken user request, the method comprising:
    at an electronic device:
      receiving a stream of audio comprising the spoken user request;
      determining a first likelihood that the stream of audio comprises user speech;
      determining a second likelihood that the stream of audio comprises user speech spoken by an authorized user of the electronic device;

weighting the first likelihood and the second likelihood;

identifying the start-point or the end-point of the spoken user request based at least in part on the weighted first likelihood and the weighted second likelihood; and identifying a portion of the stream of audio including the spoken user request using the start-point or the end-point;

processing the portion of the stream of audio to determine a corresponding task; and performing the task responsive to receiving the stream of audio.

2. The method of claim 1, wherein:

the stream of audio comprises a plurality of frames of audio;

determining the first likelihood comprises determining a likelihood that a frame of audio of the plurality of frames of audio comprises user speech;

the stream of audio comprises a plurality of segments of audio;

determining the second likelihood comprises determining a likelihood that a segment of audio of the plurality of segments of audio comprises user speech spoken by the authorized user; and a duration of the segment of audio is longer than a duration of the frame of audio.

3. The method of claim 2, wherein the duration of the segment of audio is at least five times longer than the duration of the frame of audio.

4. The method of claim 1, wherein:

the stream of audio comprises a plurality of frames of audio;

determining the first likelihood comprises determining a likelihood that a frame of audio of the plurality of frames of audio comprises user speech;

the stream of audio comprises a plurality of segments of audio;

determining the second likelihood comprises determining a likelihood that a segment of audio of the plurality of segments of audio comprises user speech spoken by the authorized user; and determining the likelihood that the frame of audio comprises user speech is performed prior to determining the likelihood that any segment of audio of the plurality of segments of audio comprises user speech spoken by the authorized user.

5. The method of claim 1, wherein the first likelihood is based at least in part on an energy level of the stream of audio.

6. The method of claim 1, wherein the second likelihood is based at least in part on a speech model of the authorized user, and wherein the speech model is based at least in part on speech of the authorized user received prior to receiving the stream of audio.

7. The method of claim 6, further comprising updating the speech model based at least in part on a second portion of the stream of audio.

8. The method of claim 1, wherein the authorized user is one of a plurality of authorized users of the electronic device.

9. The method of claim 1, wherein weighting the first likelihood and the second likelihood is based on comparing the first likelihood to the second likelihood.

10. The method of claim 1, further comprising:

combining the weighted first likelihood and the weighted second likelihood to obtain a combined likelihood score, wherein identifying the start-point or the end-point of the spoken user request is based on the combined likelihood score.

11. The method of claim 1, wherein weighting the first likelihood and the second likelihood comprises weighting the second likelihood greater than the first likelihood in accordance with the first likelihood contradicting the second likelihood.

12. The method of claim 1, wherein weighting the first likelihood and the second likelihood comprises weighting the second likelihood less than the first likelihood in accordance with the first likelihood confirming the second likelihood.

13. The method of claim 1, wherein weighting the first likelihood and the second likelihood comprises weighting the second likelihood equal to the first likelihood.

14. A method for identifying a start-point or an end-point of a spoken user request, the method comprising:

at an electronic device:

receiving a stream of audio comprising the spoken user request;

determining a first likelihood that the stream of audio comprises user speech based at least in part on an energy level of the stream of audio;

in response to the energy level exceeding a threshold energy level for longer than a predetermined threshold duration, performing speaker authentication on the stream of audio to determine a second likelihood that the stream of audio comprises speech spoken by an authorized user of the electronic device;

identifying the start-point or the end-point of the spoken user request based at least in part on the first likelihood and the second likelihood; and identifying a portion of the stream of audio including the spoken user request using the start-point or the end-point;

processing the portion of the stream of audio to determine a corresponding task; and performing the task responsive to receiving the stream of audio.

15. The method of claim 14, wherein:

the stream of audio comprises a plurality of frames of audio;

determining the first likelihood comprises determining a likelihood that a frame of audio of the plurality of frames of audio comprises user speech;

the stream of audio comprises a plurality of segments of audio;

determining the second likelihood comprises determining a likelihood that a segment of audio of the plurality of segments of audio comprises user speech spoken by the authorized user; and a duration of the segment of audio is longer than a duration of the frame of audio.

16. The method of claim 15, wherein the duration of the segment of audio is at least five times longer than the duration of the frame of audio.

17. The method of claim 14, wherein the second likelihood is based at least in part on a speech model of the authorized user, and wherein the speech model is based at least in part on speech of the authorized user received prior to receiving the stream of audio.

18. The method of claim 17, further comprising updating the speech model using a second portion of the stream of audio.

19. A method for identifying a start-point or an end-point of a spoken user request, the method comprising:
at an electronic device:
receiving a signal to begin recording an audio input, wherein the audio input comprises the spoken user request;
determining a baseline energy level of the audio input based on an energy level of a first portion of the audio input;
determining a first likelihood that the audio input comprises user speech based on an energy level of a second portion of the audio input;
in response to the baseline energy level exceeding a threshold energy level, performing speaker authentication on the second portion of the audio input to determine a second likelihood that the audio input comprises speech spoken by an authorized user of the electronic device;
identifying the start-point or the end-point of the spoken user request based at least in part on the first likelihood and the second likelihood; and
identifying a portion of the audio input including the spoken user request using the start-point or the end-point;
processing the portion of the audio input to determine a corresponding task; and
performing the task responsive to receiving the audio input.

20. The method of claim 19, wherein:
the audio input comprises a plurality of frames of audio;
determining the first likelihood comprises determining a likelihood that a frame of audio of the plurality of frames of audio comprises user speech;
the audio input comprises a plurality of segments of audio;
determining the second likelihood comprises determining a likelihood that a segment of audio of the plurality of segments of audio comprises user speech spoken by the authorized user; and
a duration of the segment of audio is longer than a duration of the frame of audio.

21. The method of claim 20, wherein the duration of the segment of audio is at least five times longer than the duration of the frame of audio.

22. The method of claim 19, wherein the second likelihood is based at least in part on a speech model of the authorized user, and wherein the speech model is based at least in part on speech of the authorized user received prior to receiving the audio input.

23. The method of claim 22, further comprising updating the speech model using a third portion of the audio input.

24. A non-transitory computer-readable storage medium comprising instructions for causing one or more processors to:
receive a stream of audio comprising the spoken user request;
determine a first likelihood that the stream of audio comprises user speech;
determine a second likelihood that the stream of audio comprises user speech spoken by an authorized user;
weight the first likelihood and the second likelihood;
identify a start-point or an end-point of the spoken user request based at least in part on the weighted first likelihood and the weighted second likelihood; and
identify a portion of the stream of audio including the spoken user request using the start-point or the end-point;
process the portion of the stream of audio to determine a corresponding task; and
perform the task responsive to receiving the stream of audio.

25. The non-transitory computer-readable storage medium of claim 24, wherein:
the stream of audio comprises a plurality of frames of audio;
determining the first likelihood comprises determining a likelihood that a frame of audio of the plurality of frames of audio comprises user speech;
the stream of audio comprises a plurality of segments of audio;
determining the second likelihood comprises determining a likelihood that a segment of audio of the plurality of segments of audio comprises user speech spoken by the authorized user; and
a duration of the segment of audio is longer than a duration of the frame of audio.

26. The non-transitory computer-readable storage medium of claim 24, wherein:
the stream of audio comprises a plurality of frames of audio;
determining the first likelihood comprises determining a likelihood that a frame of audio of the plurality of frames of audio comprises user speech;
the stream of audio comprises a plurality of segments of audio;
determining the second likelihood comprises determining a likelihood that a segment of audio of the plurality of segments of audio comprises user speech spoken by the authorized user; and
determining the likelihood that the frame of audio comprises user speech is performed prior to determining the likelihood that any segment of audio of the plurality of segments of audio comprises user speech spoken by the authorized user.

27. The non-transitory computer-readable storage medium of claim 24, wherein the first likelihood is based at least in part on an energy level of the stream of audio.

28. The non-transitory computer-readable storage medium of claim 24, wherein the second likelihood is based at least in part on a speech model of the authorized user, and wherein the speech model is based at least in part on speech of the authorized user received prior to receiving the stream of audio.

29. The non-transitory computer-readable storage medium of claim 28, further comprising instructions for causing the one or more processors to:
update the speech model based at least in part on a second portion of the stream of audio.

30. The non-transitory computer-readable storage medium of claim 24, wherein the authorized user is one of a plurality of authorized users of the electronic device.

31. The non-transitory computer-readable storage medium of claim 24, wherein weighting the first likelihood and the second likelihood is based on comparing the first likelihood to the second likelihood.

32. The non-transitory computer-readable storage medium of claim 24, further comprising instructions for causing the one or more processors to:
combine the weighted first likelihood and the weighted second likelihood to obtain a combined likelihood score, wherein identifying the start-point or the end-point of the spoken user request is based on the combined likelihood score.

33. An electronic device comprising:
one or more processors;
memory;
one or more programs, wherein the one or more programs are stored in the memory and configured to be executed by the one or more processors, the one or more programs including instructions for:
receiving a stream of audio comprising the spoken user request;
determining a first likelihood that the stream of audio comprises user speech;
determining a second likelihood that the stream of audio comprises user speech spoken by an authorized user;
weighting the first likelihood and the second likelihood;
identifying a start-point or an end-point of the spoken user request based at least in part on the weighted first likelihood and the weighted second likelihood; and
identifying a portion of the stream of audio including the spoken user request using the start-point or the end-point;
processing the portion of the stream of audio to determine a corresponding task; and
performing the task responsive to receiving the stream of audio.

34. The electronic device of claim 33, wherein:
the stream of audio comprises a plurality of frames of audio;
determining the first likelihood comprises determining a likelihood that a frame of audio of the plurality of frames of audio comprises user speech;
the stream of audio comprises a plurality of segments of audio;
determining the second likelihood comprises determining a likelihood that a segment of audio of the plurality of segments of audio comprises user speech spoken by the authorized user; and
a duration of the segment of audio is longer than a duration of the frame of audio.

35. The electronic device of claim 33, wherein:
the stream of audio comprises a plurality of frames of audio;
determining the first likelihood comprises determining a likelihood that a frame of audio of the plurality of frames of audio comprises user speech;
the stream of audio comprises a plurality of segments of audio;
determining the second likelihood comprises determining a likelihood that a segment of audio of the plurality of segments of audio comprises user speech spoken by the authorized user; and
determining the likelihood that the frame of audio comprises user speech is performed prior to determining the likelihood that any segment of audio of the plurality of segments of audio comprises user speech spoken by an authorized user.

36. The electronic device of claim 33, wherein the first likelihood is based at least in part on an energy level of the stream of audio.

37. The electronic device of claim 33, wherein the second likelihood is based at least in part on a speech model of the authorized user, and wherein the speech model is based at least in part on speech of the authorized user received prior to receiving the stream of audio.

38. The electronic device of claim 37, wherein the one or more programs further include instructions for:
updating the speech model based at least in part on a second portion of the stream of audio.

39. The electronic device of claim 33, wherein the authorized user is one of a plurality of authorized users of the electronic device.

40. The electronic device of claim 33, wherein weighting the first likelihood and the second likelihood is based on comparing the first likelihood to the second likelihood.

41. The electronic device of claim 33, wherein the one or more programs further include instructions for:
combining the weighted first likelihood and the weighted second likelihood to obtain a combined likelihood score, wherein identifying the start-point or the end-point of the spoken user request is based on the combined likelihood score.

42. A non-transitory computer-readable storage medium comprising instructions for causing one or more processors to:
receive a stream of audio comprising the spoken user request;
determine a first likelihood that the stream of audio comprises user speech based at least in part on an energy level of the stream of audio;
in response to the energy level exceeding a threshold energy level for longer than a predetermined threshold duration, perform speaker authentication on the stream of audio to determine a second likelihood that the stream of audio comprises speech spoken by an authorized user of the electronic device;
identify the start-point or the end-point of the spoken user request based at least in part on the first likelihood and the second likelihood; and
identify a portion of the stream of audio including the spoken user request using the start-point or the end-point;
process the portion of the stream of audio to determine a corresponding task; and
perform the task responsive to receiving the stream of audio.

43. An electronic device comprising:
one or more processors;
memory;
one or more programs, wherein the one or more programs are stored in the memory and configured to be executed by the one or more processors, the one or more programs including instructions for:
receiving a stream of audio comprising the spoken user request;
determining a first likelihood that the stream of audio comprises user speech based at least in part on an energy level of the stream of audio;
in response to the energy level exceeding a threshold energy level for longer than a predetermined threshold duration, performing speaker authentication on the stream of audio to determine a second likelihood that the stream of audio comprises speech spoken by an authorized user of the electronic device;
identifying the start-point or the end-point of the spoken user request based at least in part on the first likelihood and the second likelihood; and
identifying a portion of the stream of audio including the spoken user request using the start-point or the end-point;
processing the portion of the stream of audio to determine a corresponding task; and
performing the task responsive to receiving the stream of audio.

44. A non-transitory computer-readable storage medium comprising instructions for causing one or more processors to:
- receive a signal to begin recording an audio input, wherein the audio input comprises the spoken user request;
- determine a baseline energy level of the audio input based on an energy level of a first portion of the audio input;
- determine a first likelihood that the audio input comprises user speech based on an energy level of a second portion of the audio input;
- in response to the baseline energy level exceeding a threshold energy level, perform speaker authentication on the second portion of the audio input to determine a second likelihood that the audio input comprises speech spoken by an authorized user of the electronic device;
- identify the start-point or the end-point of the spoken user request based at least in part on the first likelihood and the second likelihood; and
- identify a portion of the audio input including the spoken user request using the start-point or the end-point;
- process the portion of the audio input to determine a corresponding task; and
- perform the task responsive to receiving the audio input.

45. An electronic device comprising:
one or more processors;
memory;
one or more programs, wherein the one or more programs are stored in the memory and configured to be executed by the one or more processors, the one or more programs including instructions for:
- receiving a signal to begin recording an audio input, wherein the audio input comprises the spoken user request;
- determining a baseline energy level of the audio input based on an energy level of a first portion of the audio input;
- determining a first likelihood that the audio input comprises user speech based on an energy level of a second portion of the audio input;
- in response to the baseline energy level exceeding a threshold energy level, performing speaker authentication on the second portion of the audio input to determine a second likelihood that the audio input comprises speech spoken by an authorized user of the electronic device;
- identifying the start-point or the end-point of the spoken user request based at least in part on the first likelihood and the second likelihood; and
- identifying a portion of the audio input including the spoken user request using the start-point or the end-point;
- processing the portion of the audio input to determine a corresponding task; and
- performing the task responsive to receiving the audio input.

* * * * *